(12) United States Patent
Chen et al.

(10) Patent No.: US 9,122,690 B1
(45) Date of Patent: Sep. 1, 2015

(54) SYSTEMS AND METHODS FOR IMPLEMENTING NON-NATIVE FILE ATTRIBUTES ON FILE SYSTEMS

(71) Applicant: Symantec Corporation, Mountain View, CA (US)

(72) Inventors: Jing Chen, Saratoga, CA (US); Dong Yan, Chengdu (CN)

(73) Assignee: Symantec Corporation, Mountain View, CA (US)

(*) Notice: Subject to any disclaimer, the term of this patent is extended or adjusted under 35 U.S.C. 154(b) by 169 days.

(21) Appl. No.: 13/905,114

(22) Filed: May 29, 2013

(51) Int. Cl.
| | |
|---|---|
| *G06F 17/30* | (2006.01) |
| *G06F 7/00* | (2006.01) |
| *G06F 3/06* | (2006.01) |
| *G11B 27/34* | (2006.01) |
| *G06F 17/22* | (2006.01) |

(52) U.S. Cl.
CPC .......... *G06F 17/30091* (2013.01); *G06F 3/067* (2013.01); *G06F 17/2247* (2013.01); *G06F 17/30011* (2013.01); *G06F 17/3028* (2013.01); *G11B 27/34* (2013.01)

(58) Field of Classification Search
USPC ........................................................ 707/830
See application file for complete search history.

(56) References Cited

U.S. PATENT DOCUMENTS

| | | | | |
|---|---|---|---|---|
| 8,244,701 | B2 * | 8/2012 | Sun et al. | 707/696 |
| 8,620,923 | B1 * | 12/2013 | Wormley et al. | 707/741 |
| 8,832,365 | B1 * | 9/2014 | Sims et al. | 711/111 |
| 8,887,087 | B2 * | 11/2014 | Hilgers et al. | 715/788 |

OTHER PUBLICATIONS

Don Domingo et al.; Red Hat Enterprise Linux 6—Performance Tuning Guide, Optimizing Subsystem Throughput in Red Hat Enterprise Linux 6; https://access.redhat.com/site/documentation/en-US/Red_Hat_Enterprise_Linux/6/html-single/Performance_Tuning_Guide/index.html; As made aware of on Mar. 29, 2013.

Dino Quintero et al.: Implementing the IBM General Parallel File System (GPFS) in a Cross Platform Environment; IBM Red Books; http://my.safaribooksonline.com/book/-/0738435473; Chapter 4, pp. 189-228; Published Jun. 28, 2011.

* cited by examiner

*Primary Examiner* — Kuen Lu
(74) *Attorney, Agent, or Firm* — ALG Intellectual Property, LLC (57) ABSTRACT

A computer-implemented method for implementing non-native file attributes on file systems may include receiving at least one extended attribute to apply to at least one file within a file system that does not natively implement the extended attribute, identifying an index file that indexes extended attributes of files within the file system by file identifiers of the files, determining a file identifier that uniquely identifies the file within the file system, and applying the extended attribute to the file by indexing the extended attribute by the file identifier within the index file. Various other methods, systems, and computer-readable media are also disclosed.

20 Claims, 7 Drawing Sheets

SYSTEMS AND METHODS FOR IMPLEMENTING NON-NATIVE FILE ATTRIBUTES ON FILE SYSTEMS

BACKGROUND

In the digital age, organizations may use increasingly complex information technology infrastructures to provide access to computing devices and services and to manage their digitally stored data. For example, an organization may implement a network that connects nodes using disparate file systems to facilitate sharing access to files and devices across nodes.

Because differing file systems may implement differing file attributes for files, to provide consistent views and behavior across file systems, some traditional systems may implement extended attributes for files (i.e., attributes corresponding to one file system being extended to files stored within another file system). To implement such extended attributes, some traditional systems may store extended attributes for a file in an alternate data stream (or "named stream") for that file.

Unfortunately, storing extended attributes in named streams may have several disadvantages. For example, the use of named streams may consume more inodes that would otherwise be available for use in a file system. Additionally, the use of named streams to store extended attributes may increase file system fragmentation. Furthermore, storing extended attributes in named streams may place a strain on computing resources by performing system calls related to extended attribute processing.

Accordingly, the instant disclosure identifies and addresses a need for additional and improved systems and methods for implementing non-native file attributes on file systems.

SUMMARY

As will be described in greater detail below, the instant disclosure generally relates to systems and methods for implementing non-native file attributes on file systems by storing extended attributes for files in a consolidated location. In some examples, these systems and methods may index extended attributes for files in a consolidated index file that references deduplicated extended attributes that are stored in a consolidated location.

In one example, a computer-implemented method for implementing non-native file attributes on file systems may include (1) receiving at least one extended attribute to apply to at least one file within a file system that may not natively implement the extended attribute, (2) identifying an index file that indexes extended attributes of files within the file system by file identifiers of the files, (3) determining a file identifier that uniquely identifies the file within the file system, and (4) applying the extended attribute to the file by indexing the extended attribute by the file identifier within the index file.

In one embodiment, the computer-implemented method may further include (1) identifying an attempt to access the extended attribute of the file and (2) looking up the extended attribute of the file via the index file.

In one embodiment, the extended attribute may include an access control list that regulates access to the file.

In one embodiment, (1) the index file may index extended attributes of files by indexing references to extended attributes stored in an attribute file and (2) indexing the extended attribute by the file identifier within the index file may include adding to the index file a reference to the extended attribute stored in the attribute file.

In one embodiment, the index file may also reference the extended attribute stored in the attribute file by a separate file identifier because the file and a separate file with the separate file identifier have the same extended attribute.

In some examples, the computer-implemented method may further include applying an additional extended attribute to the file by storing the additional extended attribute in association with the file identifier within the index file.

In one embodiment, determining the file identifier that uniquely identifies the file within the file system may include determining an inode value of the file within the file system.

In one embodiment, an application-layer network protocol may provide shared access to the file within the file system with an additional file system that natively implements the extended attribute within the additional file system.

In one embodiment, a system for implementing the above-described method may include (1) a receiving module that may receive at least one extended attribute to apply to at least one file within a file system that may not natively implement the extended attribute, (2) an identification module that identifies an index file that indexes extended attributes of files within the file system by file identifiers of the files, (3) a determination module that may determine a file identifier that uniquely identifies the file within the file system, (4) an application module that applies the extended attribute to the file by indexing the extended attribute by the file identifier within the index file, and (5) at least one processor configured to execute the receiving module, the identification module, the determination module and the application module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive at least one extended attribute to apply to at least one file within a file system that may not natively implement the extended attribute, (2) identify an index file that indexes extended attributes of files within the file system by file identifiers of the files, (3) determine a file identifier that uniquely identifies the file within the file system, and (4) apply the extended attribute to the file by indexing the extended attribute by the file identifier within the index file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for implementing non-native file attributes on file systems. As will be explained in greater detail below, by storing extended attributes for files in a consolidated location, the systems described herein may conserve inodes. Additionally, storing extended attributes for files in a consolidated location may decrease file system fragmentation. Storing extended attributes in a consolidated location rather than in scattered named streams may also reduce system calls related to extended attribute processing. In addition, in some examples these systems may cache recently used extended attributes to facilitate the efficient reuse of extended attributes. Furthermore, in some examples, by storing extended attributes for files in a consolidated location, these systems may deduplicate repetitive extended attribute data across files.

Figure 1:
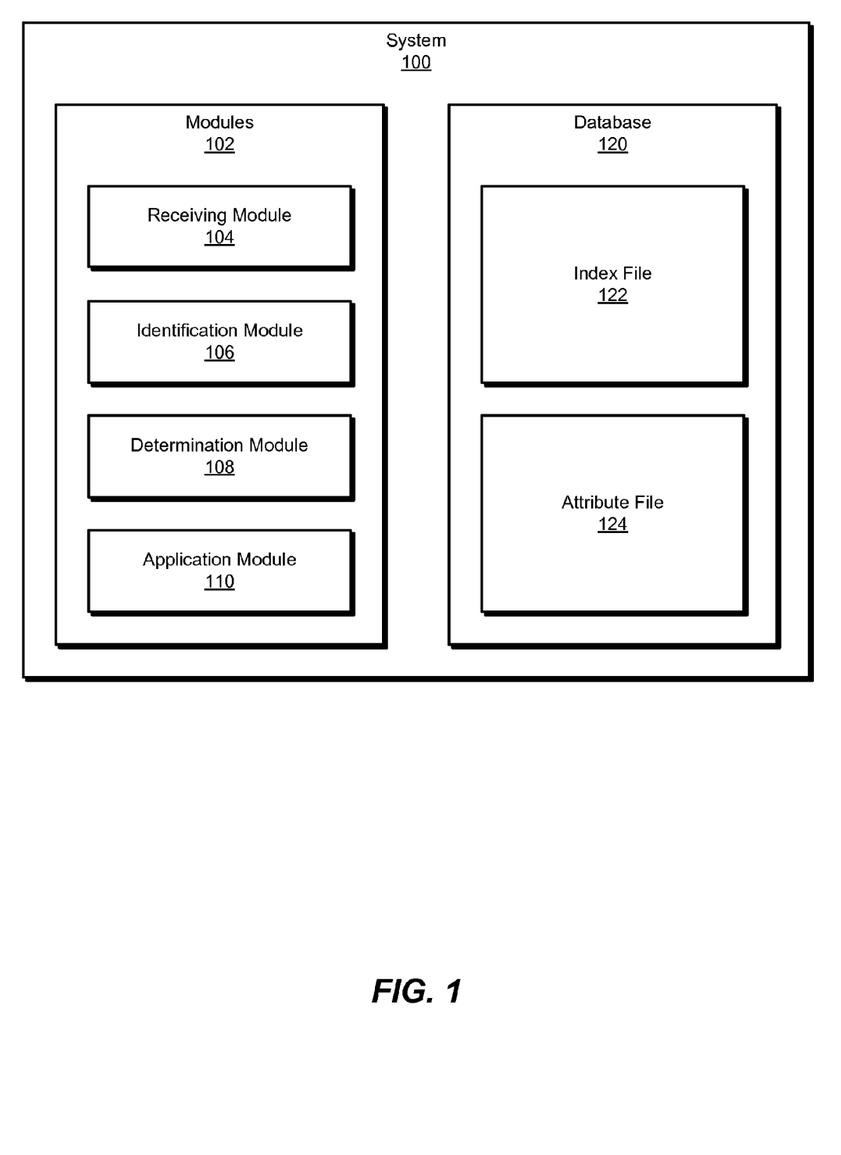
FIG. 1 is a block diagram of an exemplary system for implementing non-native file attributes on file systems.
Figure 2:
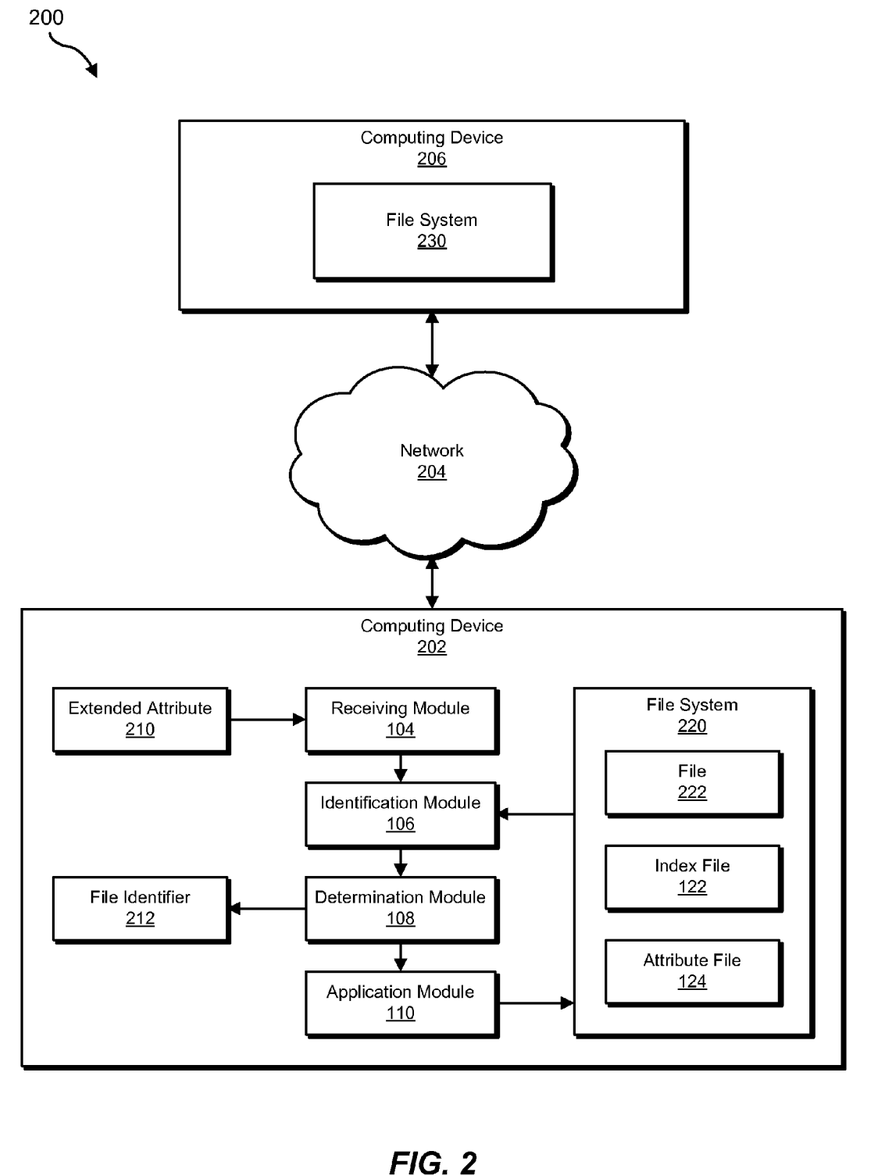
FIG. 2 is a block diagram of an exemplary system for implementing non-native file attributes on file systems.

The following will provide, with reference to FIGS. 1-2, detailed descriptions of exemplary systems for implementing non-native file attributes on file systems. Detailed descriptions of corresponding computer-implemented methods will also be provided in connection with FIG. 3. A description of an exemplary file system will be provided in connection with FIG. 4, while detailed descriptions of exemplary files for organizing and storing consolidated extended attribute information will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for implementing non-native file attributes on file systems. As illustrated in this figure, exemplary system 100 may include one or more modules 102 for performing one or more tasks. For example, and as will be explained in greater detail below, exemplary system 100 may also include a receiving module 104 that may receive at least one extended attribute to apply to at least one file within a file system that does not natively implement the extended attribute. Exemplary system 100 may additionally include an identification module 106 that may identify an index file that indexes extended attributes of files within the file system by file identifiers of the files. Exemplary system 100 may also include a determination module 108 that may determine a file identifier that uniquely identifies the file within the file system. Exemplary system 100 may additionally include an application module 110 that may apply the extended attribute to the file by indexing the extended attribute by the file identifier within the index file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or computing device 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In some examples, database 120 may be configured to store an index file 122 that indexes extended attribute information by file identification information. In one example, database 120 may be configured to store an attribute file 124 that stores extended attribute information (e.g., referenced by index file 122).

Database 120 may represent portions of a single database or computing device or a plurality of databases or computing devices. For example, database 120 may represent a portion of computing device 202 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing device 206 via a network 204. Computing device 202 may be programmed with one or more of modules 102 and/or may store all or a portion of the data in database 120. Additionally or alternatively, computing device 206 may be programmed with one or more of modules 102 and/or may store all or a portion of the data in database 120. In some examples, computing device 202 may be configured to share access to one or more files stored in a file system 220 (including, e.g., a file 222) with computing device 206 via a file system 230.

In one embodiment, one or more of modules 102 from FIG. 1 may, when executed by at least one processor of computing device 202 and/or computing device 206, facilitate computing device 202 and/or computing device 206 in implementing non-native file attributes on file systems. For example, and as will be described in greater detail below, one or more of modules 102 may cause computing device 202 and/or computing device 206 to implement non-native file attributes on file system 220 (e.g., that are native to file system 230). For example, and as will be described in greater detail below, receiving module 104 may be programmed to receive at least one extended attribute 210 to apply to a file 222 within a file system 220 that does not natively implement extended attribute 210. Identification module 106 may be programmed to identify an index file 122 that indexes extended attributes of files within file system 220 by file identifiers of the files. Determination module 108 may be programmed to determine a file identifier 212 that uniquely identifies file 222 within file system 220. Applying module 110 may be programmed to apply extended attribute 210 to file 222 by indexing extended attribute 210 by file identifier 212 within index file 122.

Computing devices 202 and 206 generally represent any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and computing device 206.

Figure 3:
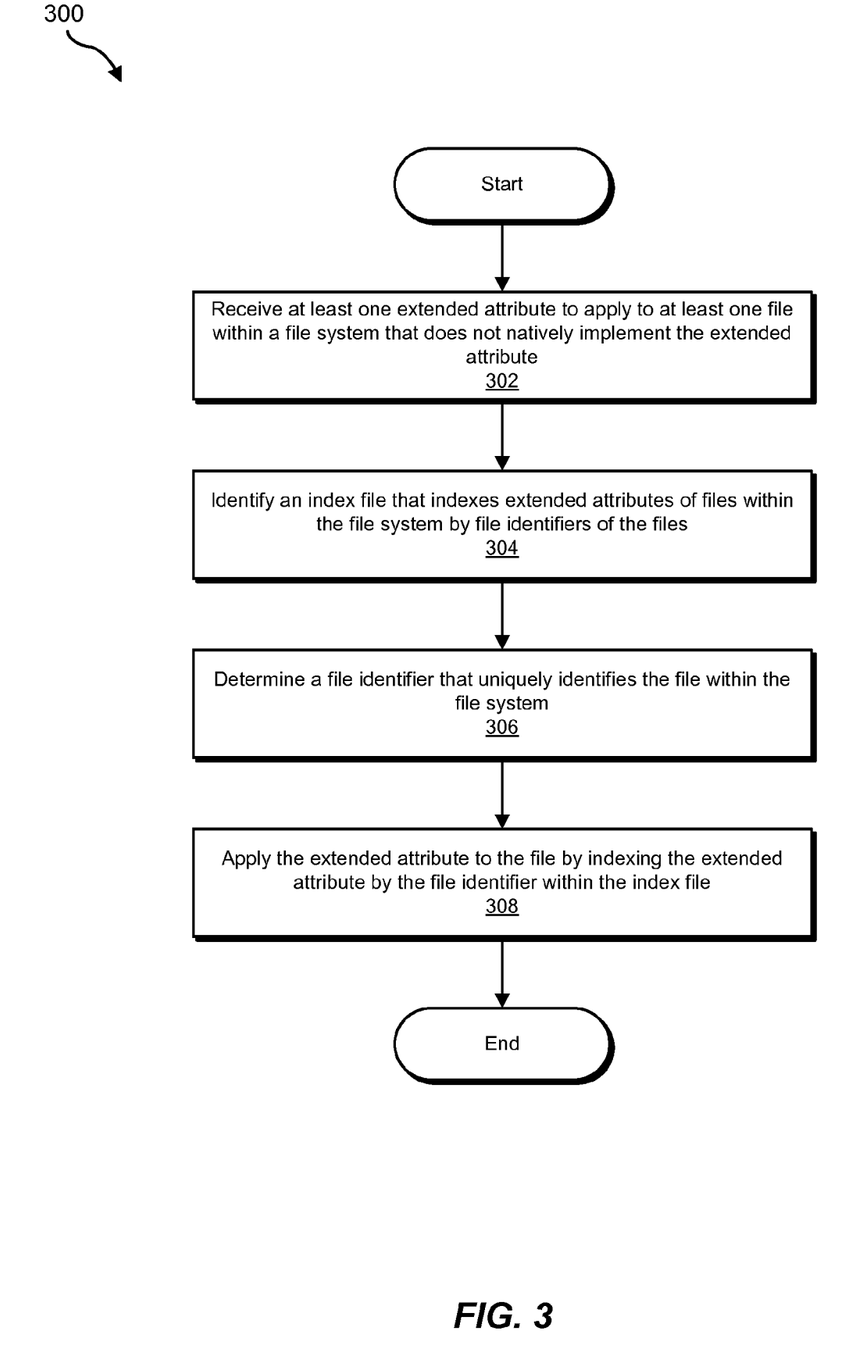
FIG. 3 is a flow diagram of an exemplary method for implementing non-native file attributes on file systems.

FIG. 3 is a flow diagram of an exemplary computer-implemented method 300 for implementing non-native file attributes on file systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive at least one extended attribute to apply to at least one file within a file system that does not natively implement the extended attribute. For example, at step 302 receiving module 104 may, as part of computing device 202 in FIG. 2, receive at least one extended attribute 210 to apply to file 222 within file system 220 that does not natively implement extended attribute 210.

As used herein, the phrase "file system" may refer to any system for organizing, managing, and/or storing files. In some examples, the file system may include a file system (such as a UNIX-type file system) that does not natively support all file attributes (such as access control lists) implemented by MICROSOFT WINDOWS file systems (e.g., NTFS). For example, the file system may include UNIX FILE SYSTEM, ext3, and/or HFS PLUS.

As used herein, the term "attribute," as it relates to files, may refer to any metadata that describes a file and/or impacts the behavior of a file system with respect to the file. In some examples, the extended attribute may include an access control list for the file.

As used herein, the phrase "access control list" may refer to one or more permissions and/or rules that regulate access to a corresponding file. In some examples, the access control list may specify one or more types of file access and one or more users and/or groups that are permitted and/or forbidden from each type of file access. For example, the access control list may specify which users and/or groups may read from, write to, and/or execute the file. In some examples, the access control list may correspond to an NTFS access control list.

In some examples, an application-layer network protocol may provide shared access to the file within the file system with an additional file system that natively implements the extended attribute within the additional file system. For example, the application-layer network protocol may include Common Internet File System. For example, software such as SAMBA may implement the Common Internet File System protocol on a UNIX-like system that uses the file system to provide MICROSOFT WINDOWS clients that use the additional file system shared access to the file.

Receiving module 104 may receive the extended attribute in any suitable manner. For example, receiving module 104 may receive the extended attribute via user input (e.g., an administrator setting an access control list for the file). In another example, receiving module 104 may receive the extended attribute in response to an operation performed on the file (e.g., receiving module 106 may receive a creation time of the file from a file system agent when the file is created).

Figure 4:
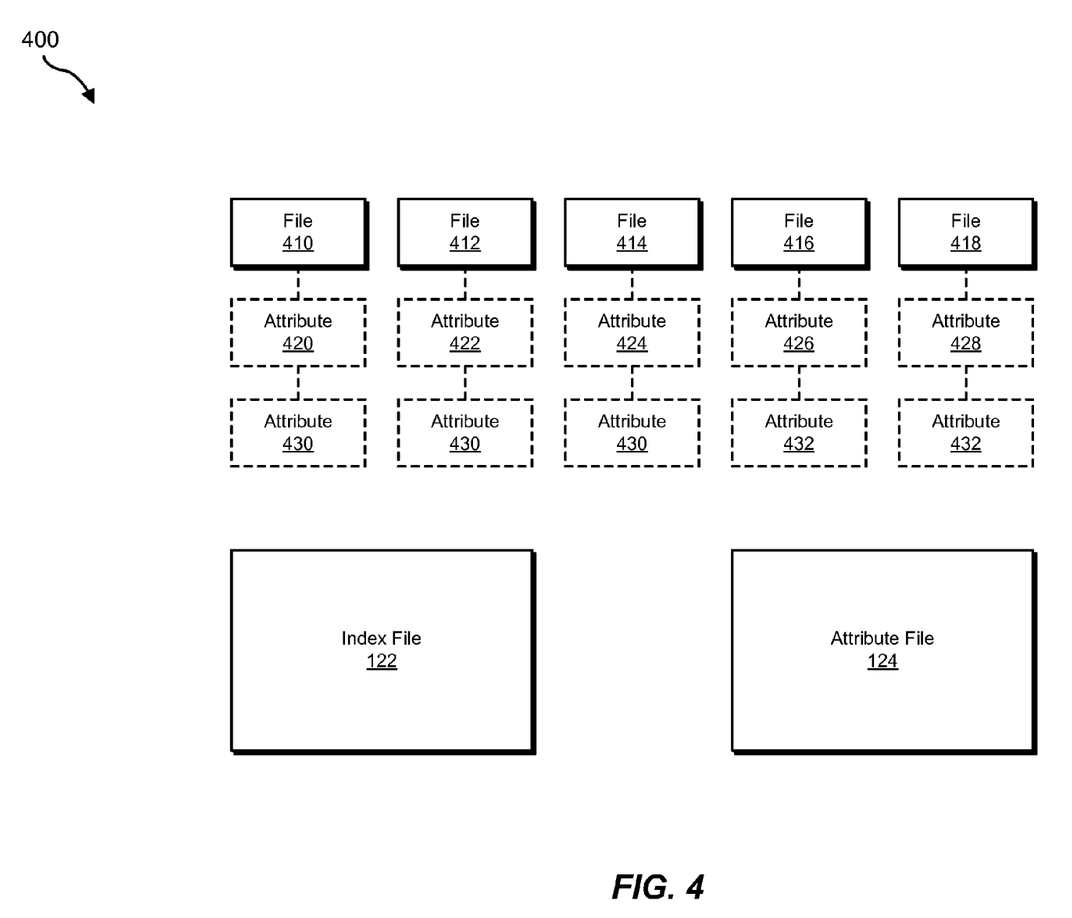
FIG. 4 is a block diagram of an exemplary file system.

FIG. 4 illustrates an exemplary file system 400. As shown in FIG. 4, file system 400 may include files 410, 412, 414, 416, and 418, as well as index file 122 and attribute file 124 for storing extended attributes for files 410, 412, 414, 416, and 418. Using FIG. 4 as an example, identification module 104 may receive attributes 420 and 430 to apply to file 410, attributes 422 and 430 to apply to file 412, attributes 424 and 430 to apply to file 414, attributes 426 and 432 to apply to file 416, and attributes 428 and 432 to apply to file 418.

Returning to FIG. 3, at step 304 one or more of the systems described herein may identify an index file that indexes extended attributes of files within the file system by file identifiers of the files. For example, at step 304 identification module 106 may, as part of computing device 202 in FIG. 2, identify an index file 122 that indexes extended attributes of files within file system 220 by file identifiers of the files.

Identification module 106 may identify the index file in any suitable manner. For example, identification module 106 may identify a configured storage location of the index file. As used herein, the phrase "index file" may refer to any consolidated file, database, and/or other stored data structure that stores information relating to extended attributes of multiple files within a file system. In some examples, the index file may include contiguously stored data.

In some examples, the index file may index extended attributes of files by storing extended attributes at indexed locations within the index file. Additionally or alternatively, the index file may index extended attributes of files by indexing references to extended attributes that are stored in an attribute file. As used herein, the phrase "attribute file" may refer to any consolidated file, database, and/or other stored data structure that stores information relating to extended attributes of multiple files within a file system.

In one example, the index file may include a series of fixed-size blocks, each representing an inode number of the file system. For example, each block may be 1 kilobyte in size. In this example, a block with extended attribute information for a file may be found by multiplying the inode number of the file by the block size (e.g., 1 kilobyte). In this manner, extended attributes for any given file may be quickly accessed.

Figure 5:
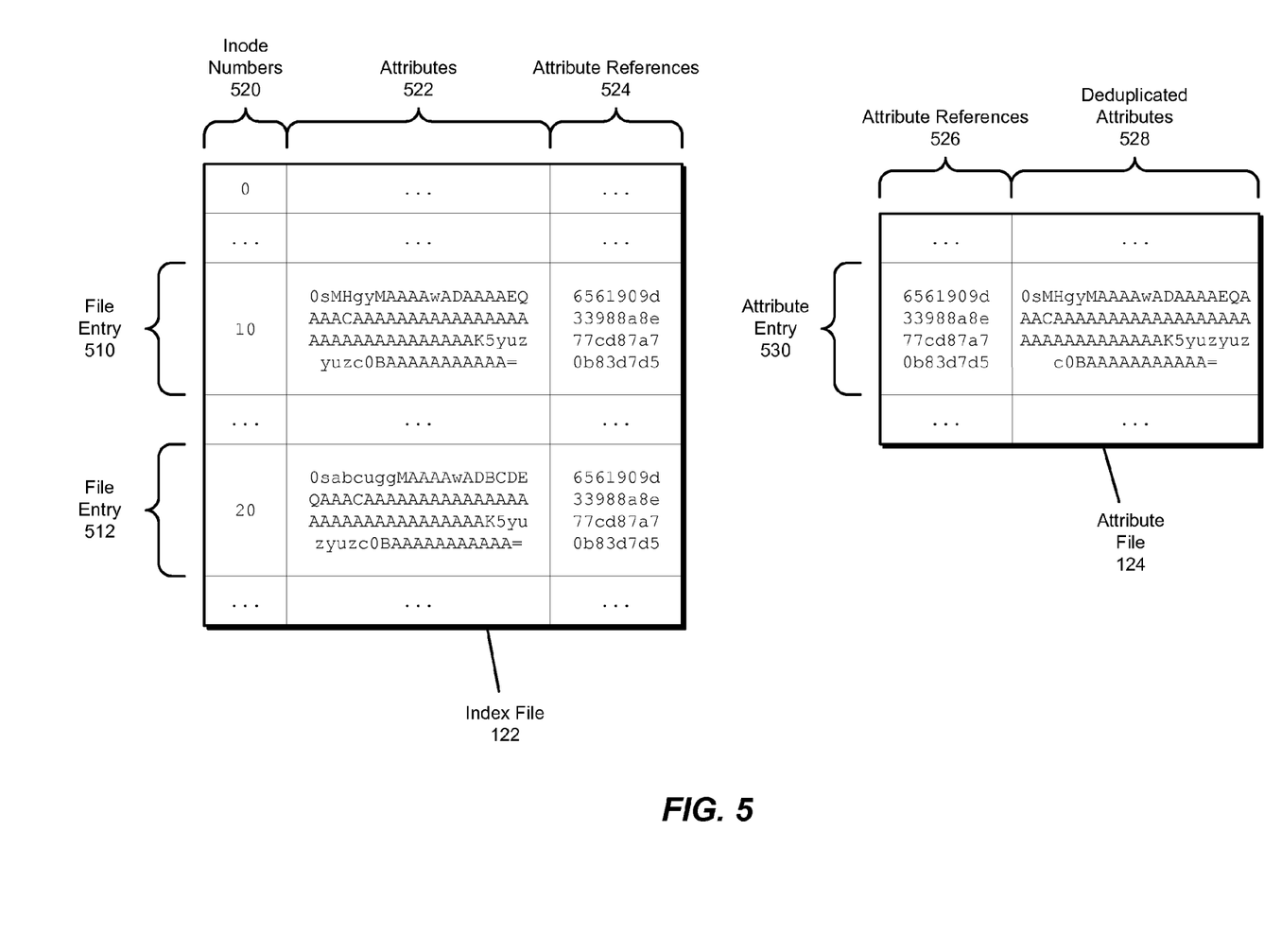
FIG. 5 is a block diagram of exemplary files for storing extended attributes.

FIG. 5 provides an exemplary illustration of index file 122 and attribute file 124. Using FIG. 5 as an example, index file 122 may index extended attributes for files 410, 412, 414, 416, and 418 of FIG. 4 according to inode numbers 520. For example, index file 122 may index attributes 522 and attribute references 524 by inode numbers 520. For example, file 410 from FIG. 4 may have an inode number of 10. Accordingly, a file entry 510 of index file 122 may directly store an extended attribute of file 410 (e.g., attribute 420 of FIG. 4), as well as a reference to an extended attribute of file 410 (e.g., attribute 430 of FIG. 4) that refers to an attribute entry 530 of attribute file 124. For example, attribute references 524 of index file 122 may match attribute references 526 of attribute file 124, which may correspond to deduplicated attributes 528 stored in attribute file 124.

Returning to FIG. 3, at step 306 one or more of the systems described herein may determine a file identifier that uniquely identifies the file within the file system. For example, at step 306 determination module 108 may, as part of computing device 202 in FIG. 2, determine a file identifier 212 that uniquely identifies file 222 within file system 220.

Determination module 108 may determine the file identifier that uniquely identifies the file within the file system in any suitable manner. For example, as mentioned above, the index file may index the files in the file system according to inode numbers of the files. Accordingly, determination module may determine an inode value of the file within the file system.

As used herein, the term "inode" may refer to any metadata structure used for locating blocks of a file within a file system. Accordingly, the phrase "inode number" (or "inode value") may refer to any unique identifier of such a metadata structure. Determination module 108 may identify the inode value of the file in any suitable manner. For example, determination module 108 may obtain an inode number of the file by querying the operating system (e.g., via a kernel extension capable of supplying the inode number of the file). Using FIG. 4 as an example, determination module 108 may determine the inode values of files 410, 412, 414, 416, and 418.

Returning to FIG. 3, at step 308 one or more of the systems described herein may apply the extended attribute to the file by indexing the extended attribute by the file identifier within the index file. For example, at step 308 application module 110 may, as part of computing device 202 in FIG. 2, apply extended attribute 210 to file 222 by indexing extended attribute 210 by file identifier 212 within index file 122.

Applying module 110 may index the extended attribute within the index file in any suitable manner. For example, as mentioned earlier, the index file may store references to extended attributes within an attribute file. Accordingly, application module 110 may add to the index file a reference to the extended attribute stored in the attribute file. In some examples, application module 110 may also add the extended attribute to the attribute file such that the reference within the index file references the extended attribute within the attribute file. In some examples, the index file may also reference the extended attribute stored in the attribute file by a separate file identifier because the file and a separate file with the separate file identifier have the same extended attribute. In these examples, application module 110 may identify the extended attribute already stored within the attribute file (e.g., a reference to which is already indexed within the index file by the separate file identifier) and add a reference to the extended attribute already stored within the attribute file to the index file at an index corresponding to the file identifier. In some examples, application module 110 may cause the index file to reference deduplicated attributes within the attribute file where the deduplicated attributes are of an attribute type that is likely to be repeated across many files (e.g., access control lists).

In some examples, application module 110 may apply an additional extended attribute to the file by storing the additional extended attribute in association with the file identifier within the index file. In these examples, the additional extended attribute may be stored within the index file directly instead of by reference. For example, application module 110 may store DOSATTRIB attribute data for entries in the index file. In some examples, application module 110 may store file creation time data for entries in the index file. In some examples, application module 110 may cause the index file to store the additional extended attribute directly within the index file because the additional extended attribute is unlikely to be repeated across many files (e.g., because an exact creation time of a file is more likely to be unique to the file within the file system).

Using FIGS. 4 and 5 as examples, application module 110 may apply attribute 420 to file 410 by storing attribute 420 at the attributes 522 offset of file entry 510 of index file 122. For example, "0sMHgyMAAAAwADAAAAEQAA-ACAAAAAAAAAAAAAAAAAAAAAAAAAAAA-AAAK5yuzyuz cOBAAAAAAAAAAA=" may represent attribute 420. Application module 110 may also apply attribute 430 to file 410 by generating a hash of attribute 430 (e.g., an md5 hash) and storing the hash at the attribute references 524 offset of file entry 510 of index file 122. For example, "6561909d33988a8e77cd87a70b83d7d5" may represent a hash of attribute 430. Application module 110 may also add an attribute entry 530 in attribute file 124 for attribute 430 by adding the hash of attribute 430 at the attribute references 526 offset of attribute entry 530 of attribute file 124 and adding attribute 430 itself at the deduplicated attributes 528 offset of attribute entry 530 of attribute file 124. Accordingly, the hash, when located in index file 122, may be used to look up attribute 430 within attribute file 124. Likewise, application module 110 may apply attribute 422 to file 412 by adding attribute 422 at the offset of attributes 522 of a file entry 512 of index file 122. Additionally, application module 110 may apply attribute 430 to file 412 by generating the hash of attribute 430 and storing the hash at the offset of attribute references 524 of file entry 512 within index file 122. Because attribute 430 (and its hash) may already be represented in attribute entry 530 of attribute file 124, application module 110 may not create an additional entry in attribute file 124.

In some examples, one or more of the systems described herein may also identify an attempt to access the extended attribute of the file and look up the extended attribute of the file via the index file. For example, these systems may determine the inode number of the file, and, to retrieve the DOSATTRIB extended attribute, calculate an offset of the index file entry by multiplying the inode number by the index entry size (e.g., 1 kilobyte) and read the DOSATTRIB extended attribute from the entry at the calculated offset. As another example, these systems may determine the inode number of the file, and, to retrieve the access control list extended attribute, calculate an offset of the index file entry by multiplying the inode number by the index entry size (e.g., 1 kilobyte) and read a hash value of the access control list extended attribute from the entry at the calculated offset within the index file. These systems may then use the hash to find an entry in an attribute file that stores the access control list extended attribute. In some examples, these systems may implement getxattr, setxattr, and/or listxattr system calls for reading, setting, and/or listing extended attributes.

In some examples, one or more of the systems described herein may also cache extended attributes in memory once retrieved, such that these systems may read recently retrieved extended attributes more quickly than accessing the recently retrieved extended attributes from disk again. For example, these systems may maintain a hash table and/or B+ tree in memory for caching recently retrieved extended attributes.

In some examples, the systems described herein may store extended attributes separately from the original data files in an on-disk format. These extended attributes may include attributes such as DOSATTRIB (e.g., used to save file creation time) and NTACL (e.g., used to save access control lists of NTFS). Because the creation time of files may tend to differ, these systems may store the DOSATTRIB for each file directly in an index file. Because access control lists may frequently be the same (e.g., because a user may change permissions from a top-level parent directory), and because access control lists may be modified infrequently but read from more frequently, these systems may store the access control list for each file in an attribute file of deduplicated access control list data referenced by the index file.

By storing extended attributes for files in a consolidated location, the systems described herein may conserve inodes. Additionally, storing extended attributes for files in a consolidated location may decrease file system fragmentation. Storing extended attributes in a consolidated location rather than in scattered named streams may also reduce system calls related to extended attribute processing. In addition, in some examples these systems may cache recently used extended attributes to facilitate the efficient reuse of extended attributes. Furthermore, in some examples, by storing extended attributes for files in a consolidated location, these systems may deduplicate repetitive extended attribute data across files.

Figure 6:
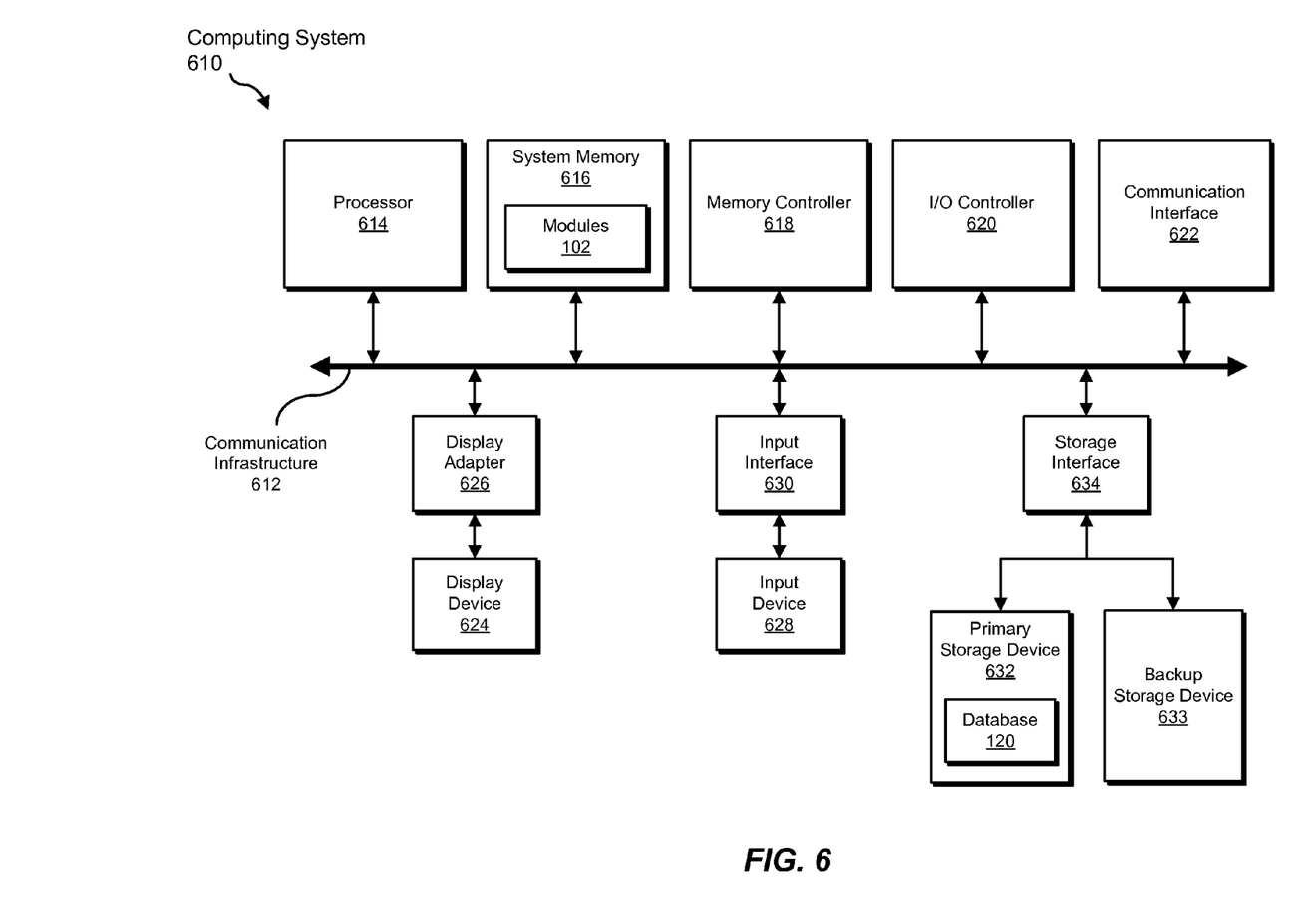
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
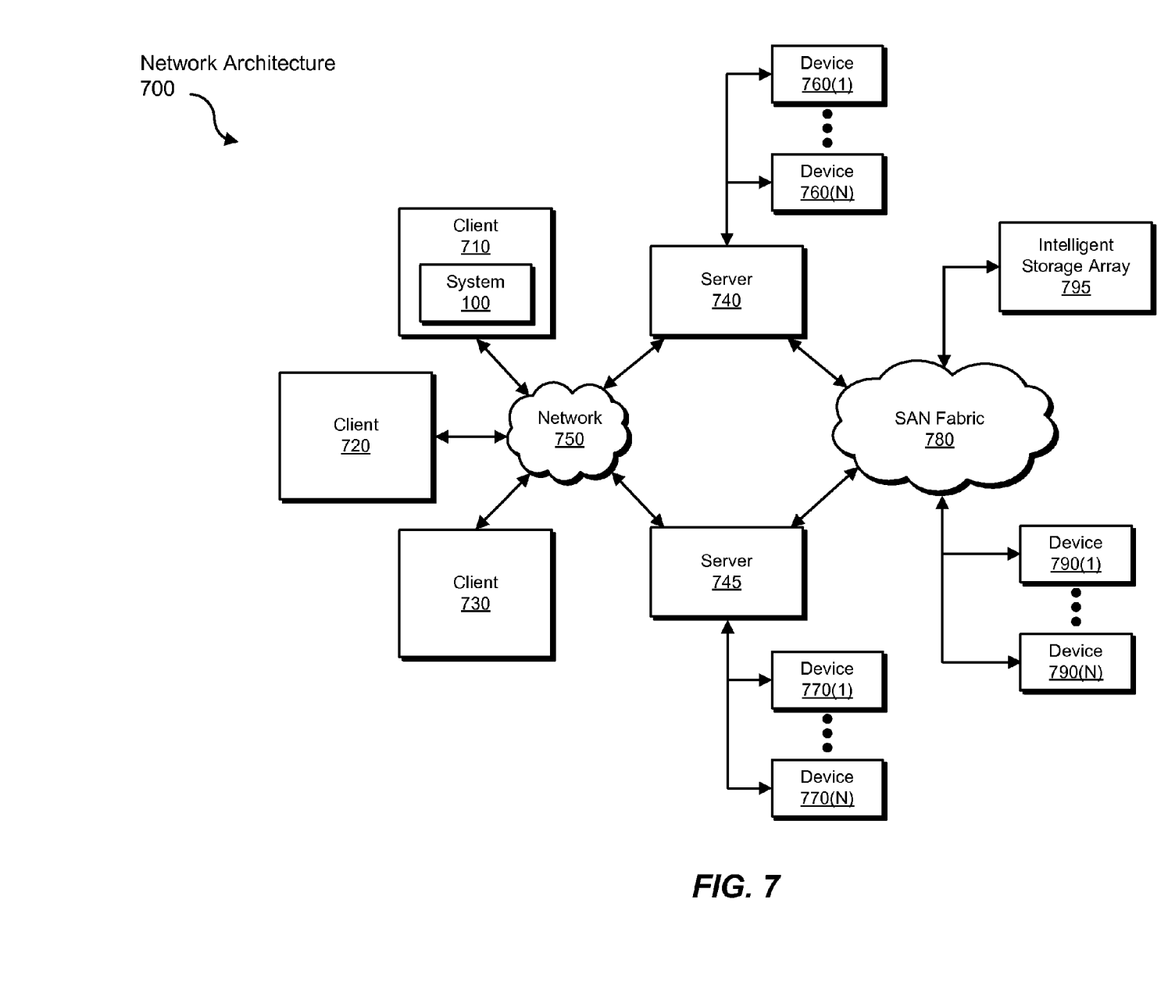
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for implementing non-native file attributes on file systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive extended attribute information to be transformed, transform the extended attribute information, output a result of the transformation to a consolidated and/or contiguous data structure for storing extended attribute information for multiple files, use the result of the transformation to implement extended attributes, and store the result of the transformation to a storage device used by a file system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for implementing non-native file attributes on file systems, at least a portion of the method being performed by a computing device comprising at least one processor, the method comprising:
   storing, in a consolidated location, deduplicated extended attributes of files within a file system that does not natively implement the extended attributes;
   receiving at least one extended attribute to apply to at least one file within the file system;
   identifying an index file that:
      indexes the deduplicated extended attributes of the files within the file system by file identifiers of the files;
      references the deduplicated extended attributes that are stored in the consolidated location;
   determining a file identifier that uniquely identifies the file within the file system;
   applying the extended attribute to the file by:
      storing the extended attribute in the consolidated location;
      indexing the extended attribute stored in the consolidated location by the file identifier within the index file.

2. The computer-implemented method of claim 1, further comprising:
   identifying an attempt to access the extended attribute of the file;
   looking up the extended attribute of the file via the index file.

3. The computer-implemented method of claim 1, wherein the extended attribute comprises an access control list that regulates access to the file.

4. The computer-implemented method of claim 1, wherein:
   the index file indexes extended attributes of files by indexing references to the deduplicated extended attributes stored in an attribute file at the consolidated location;
   indexing the extended attribute by the file identifier within the index file comprises adding to the index file a reference to the extended attribute stored in the attribute file at the consolidated location.

5. The computer-implemented method of claim 4, wherein the index file also references the extended attribute stored in the attribute file by a separate file identifier because the file and a separate file with the separate file identifier have the same extended attribute.

6. The computer-implemented method of claim 5, further comprising applying an additional extended attribute to the file by storing the additional extended attribute in association with the file identifier within the index file.

7. The computer-implemented method of claim 1, wherein determining the file identifier that uniquely identifies the file within the file system comprises determining an inode value of the file within the file system.

8. The computer-implemented method of claim 1, further comprising an application-layer network protocol that provides shared access to the file within the file system with an additional file system that natively implements the extended attribute within the additional file system.

9. A system for implementing non-native file attributes on file systems, the system comprising:
   an application module, stored in memory, that stores, in a consolidated location, deduplicated extended attributes of files within a file system that does not natively implement the extended attributes;
   a receiving module, stored in memory, that receives at least one extended attribute to apply to at least one file within the file system;

an identification module, stored in memory, that identifies an index file that:
  indexes the deduplicated extended attributes of the files within the file system by file identifiers of the files;
  references the deduplicated extended attributes that are stored in the consolidated location;
a determination module, stored in memory, that determines a file identifier that uniquely identifies the file within the file system;
wherein the application module further applies the extended attribute to the file by:
  storing the extended attribute in the consolidated location;
  indexing the extended attribute stored in the consolidated location by the file identifier within the index file;
at least one processor configured to execute the receiving module, the identification module, the determination module, and the application module.

10. The system of claim 9, further comprising an access module that:
  identifies an attempt to access the extended attribute of the file;
  looks up the extended attribute of the file via the index file.

11. The system of claim 9, wherein the extended attribute comprises an access control list that regulates access to the file.

12. The system of claim 9, wherein:
  the index file indexes extended attributes of files by indexing references to the deduplicated extended attributes stored in an attribute file at the consolidated location;
  the application module indexes the extended attribute by the file identifier within the index file by adding to the index file a reference to the extended attribute stored in the attribute file at the consolidated location.

13. The system of claim 12, wherein the index file also references the extended attribute stored in the attribute file by a separate file identifier because the file and a separate file with the separate file identifier have the same extended attribute.

14. The system of claim 13, wherein the application module applies an additional extended attribute to the file by storing the additional extended attribute in association with the file identifier within the index file.

15. The system of claim 9, wherein the determination module determines the file identifier that uniquely identifies the file within the file system by determining an inode value of the file within the file system.

16. The system of claim 9, further comprising an application-layer network protocol that provides shared access to the file within the file system with an additional file system that natively implements the extended attribute within the additional file system.

17. A non-transitory computer-readable-storage medium comprising one or more computer-readable instructions that, when executed by at least one processor of a computing device, cause the computing device to:
  store, in a consolidated location, deduplicated extended attributes of files within a file system that does not natively implement the extended attributes;
  receive at least one extended attribute to apply to at least one file within the file system;
  identify an index file that:
    indexes the deduplicated extended attributes of the files within the file system by file identifiers of the files;
    references the deduplicated extended attributes that are stored in the consolidated location;
  determine a file identifier that uniquely identifies the file within the file system;
  apply the extended attribute to the file by:
    storing the extended attribute in the consolidated location;
    indexing the extended attribute stored in the consolidated location by the file identifier within the index file.

18. The non-transitory computer-readable-storage medium of claim 17, wherein the one or more computer-readable instructions cause the computing device to:
  identify an attempt to access the extended attribute of the file;
  look up the extended attribute of the file via the index file.

19. The non-transitory computer-readable-storage medium of claim 17, wherein the extended attribute comprises an access control list that regulates access to the file.

20. The non-transitory computer-readable-storage medium of claim 17, wherein:
  the index file indexes extended attributes of files by indexing references to the deduplicated extended attributes stored in an attribute file at the consolidated location;
  the one or more computer-readable instructions cause the computing device to index the extended attribute by the file identifier within the index file by adding to the index file a reference to the extended attribute stored in the attribute file at the consolidated location.

* * * * *